United States Patent

Hsiao et al.

[11] Patent Number: 6,092,381
[45] Date of Patent: Jul. 25, 2000

[54] REFRIGERATOR FOR A MOTOR VEHICLE

[75] Inventors: Chia-Long Hsiao; Wan Fu Kuo; Shueh-Cheng Lu; King-Chun Kao, all of Taipei, Taiwan

[73] Assignee: Hsinlon A/C Systems Limited, Taipei, Taiwan

[21] Appl. No.: 09/181,053

[22] Filed: Oct. 27, 1998

[30] Foreign Application Priority Data

Nov. 8, 1997 [TW] Taiwan .................................. 86218785

[51] Int. Cl.[7] .................................................. F25D 15/00
[52] U.S. Cl. ............................ 62/237; 62/244; 62/434
[58] Field of Search .............................. 62/237, 239, 244, 62/434, 430

[56] References Cited

U.S. PATENT DOCUMENTS

| | | |
|---|---|---|
| 2,566,865 | 9/1951 | Wingeter . |
| 2,915,885 | 12/1959 | Regan . |
| 3,505,830 | 4/1970 | Koerner . |
| 4,637,222 | 1/1987 | Fujiwara et al. .......................... 62/244 |
| 5,172,567 | 12/1992 | Sadhir ....................................... 62/434 |
| 5,272,887 | 12/1993 | Zendzian, Sr. ............................ 62/295 |
| 5,644,929 | 7/1997 | Tanaka et al. ............................. 62/406 |
| 5,701,754 | 12/1997 | Choi et al. ................................. 62/244 |

*Primary Examiner*—Henry Bennett
*Assistant Examiner*—Melvin Jones
*Attorney, Agent, or Firm*—Pro-Techtor International Services

[57] ABSTRACT

A refrigerator mounted in a motor vehicle and connected to a refrigerant circulating system of the motor vehicle, having a liquid refrigerating medium container at a bottom side thereof the liquid refrigerating medium container holding a liquid refrigerating medium and a coil in the liquid refrigerating medium, the coil being connected in series to the circulating loop of the refrigerant circulating system of the motor vehicle through which a refrigerant is circulated.

5 Claims, 3 Drawing Sheets

REFRIGERATOR FOR A MOTOR VEHICLE

BACKGROUND OF THE INVENTION

The present invention relates to refrigerators, and more particularly to a refrigerator for a motor vehicle which utilizes the circulation of the refrigerant in the refrigerant circulating system of the motor vehicle for freezing a liquid refrigerating medium for keeping storage food or beverage cool.

Conventional refrigerators for use in motor vehicles are commonly designed to obtain electric power supply from the car battery. These refrigerators consume much car battery power supply, and do no work when the car engine is turned off. Further, a motor vehicle is generally equipped with an air-conditioner having a refrigerant circulating system. It is economic to utilize the refrigerant circulating system of a motor vehicle for freezing a liquid refrigerating medium for keeping food cool.

SUMMARY OF THE INVENTION

The present invention has been accomplished under the circumstances in view. It is one object of the present invention to provide a refrigerator for a motor vehicle which does not consume electric power supply. It is another object of the present invention to provide a refrigerator which utilizes the refrigerant circulating system for freezing a liquid refrigerating medium for keeping food cool. To achieve these and other objects of the present invention, there is provided a refrigerator mounted in a motor vehicle and connected in series of a refrigerant circulating system of the motor vehicle. The refrigerator comprises a liquid refrigerating medium container at a bottom side thereof. The liquid refrigerating medium container holds a liquid refrigerating medium, and a coil in the liquid refrigerating medium. The coil is connected in series to the circulating loop of the refrigerant circulating system of the motor vehicle through which a refrigerant is circulated. When the motor vehicle is started, the refrigerant is circulating in the refrigerant circulating system through the coil, and the liquid refrigerating medium is caused to change to ice to keep storage food, beverage, etc. cool. When the engine of the motor vehicle is turned off, the frozen refrigerating medium absorbs ambient heat, and is caused to change from ice to liquid.

DETAILED DESCRIPTION OF THE PREFERRED EMBODIMENT

Figure 1:
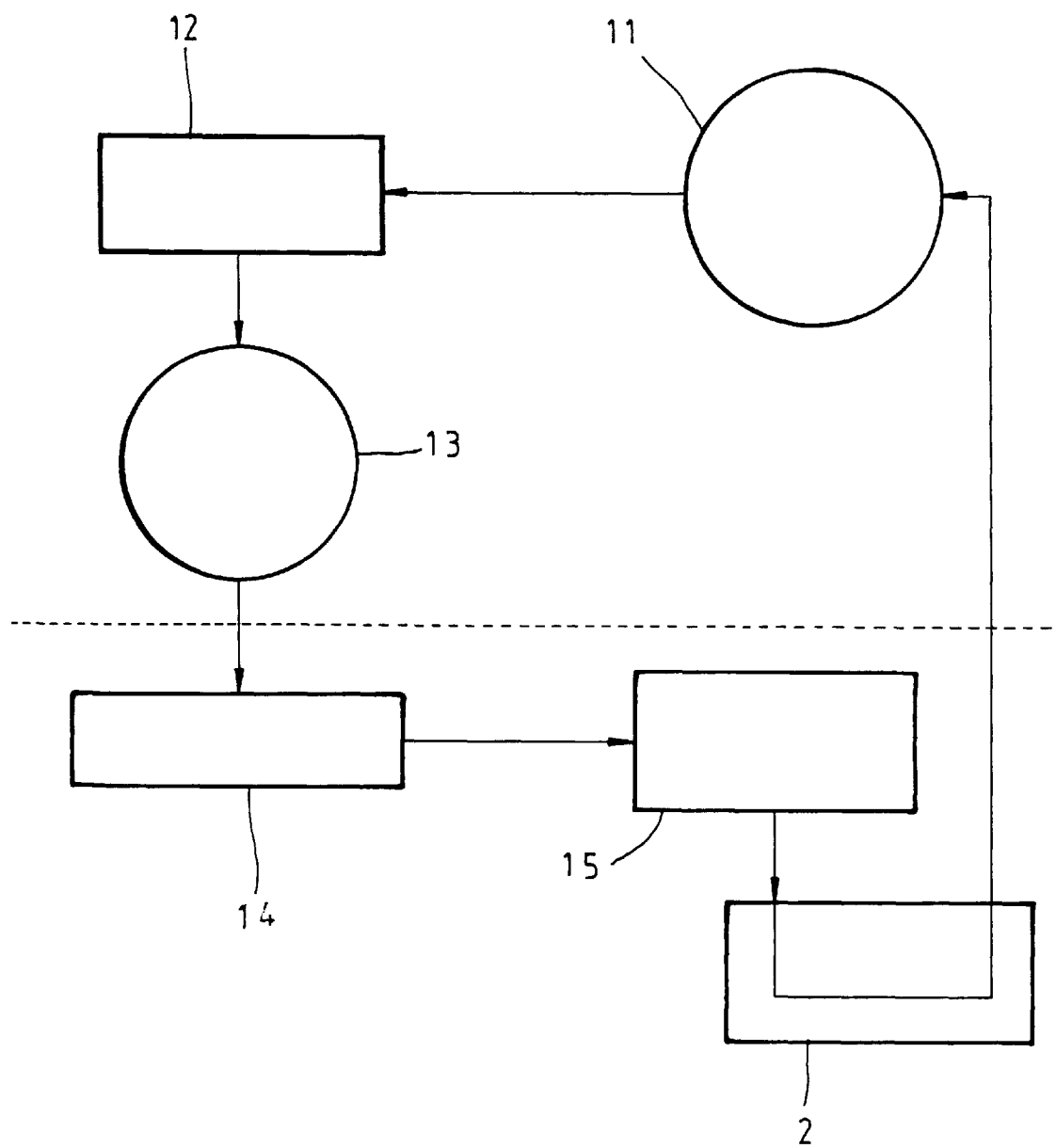
FIG. 1 is a block diagram showing a refrigerator connected in series to a refrigerant circulating system of a motor vehicle.

Referring to FIG. 1, a refrigerator 2 is installed in a refrigerant circulating system of a motor vehicle. The refrigerant circulating system comprises a compressor 11, a condenser 12, an accumulator 13, a volume meter 14, and an evaporator 15. The refrigerator 2 is connected between the evaporator 15 and the compressor 11.

Figure 2:
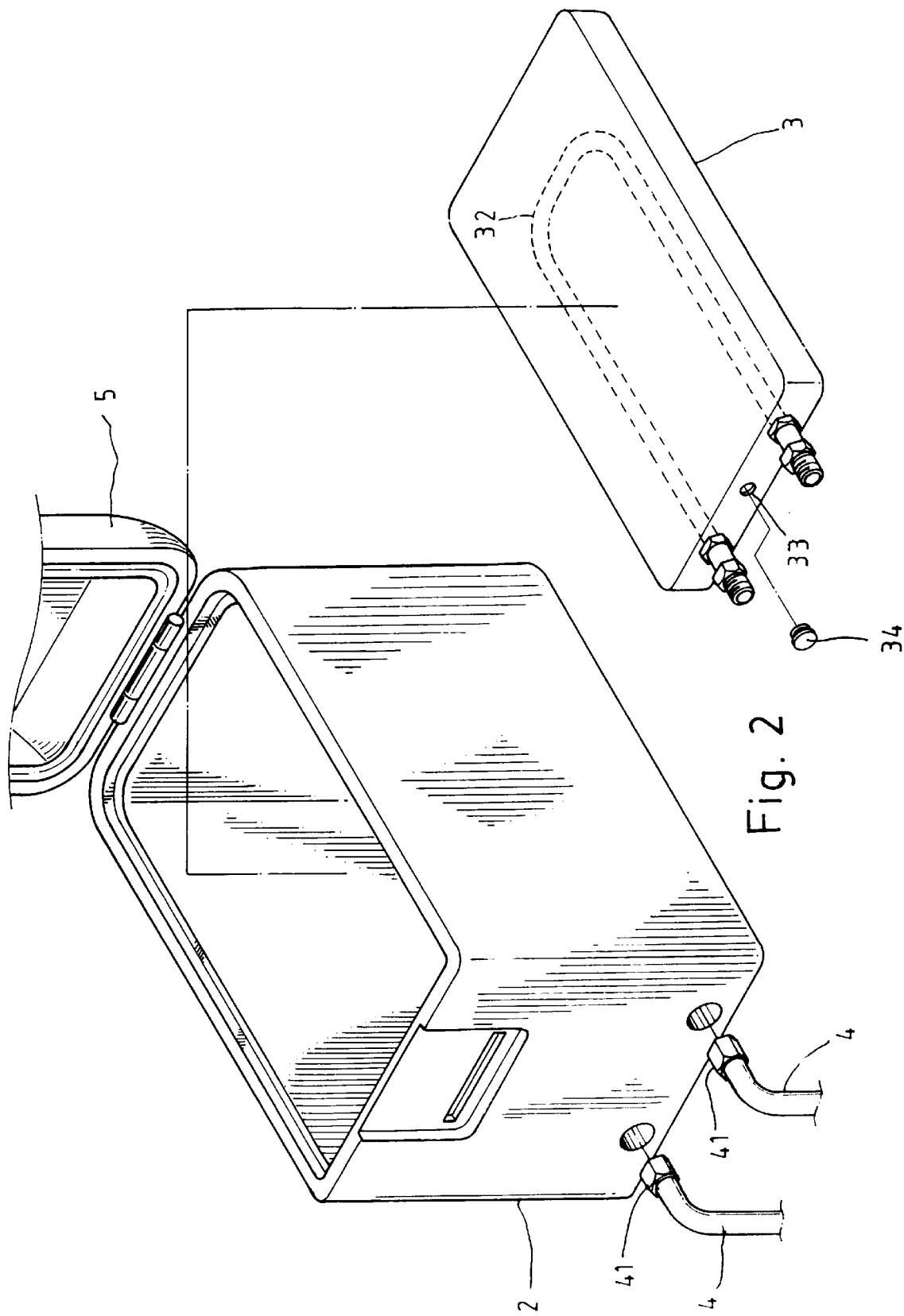
FIG. 2 is an exploded view of a refrigerator according to the present invention.

Referring to FIG. 2, the refrigerator 2 comprises a flat refrigerant container 3 on the inside at the bottom. The refrigerant container 3 is filled up with a liquid refrigerating medium 31, having a coil 32 mounted on the inside within the liquid refrigerating medium 31. The refrigerant container 3 is preferably made from material of high coefficient of cold transfer, having a filling hole 33 through which the liquid refrigerating medium 31 is filled into the inside space of the refrigerant container 3, and a stopper 34 fastened to the filling hole 33 to seal the gap. Two tubes 4 (which are respectively extended from the evaporator 15 and the compressor 11 of the aforesaid refrigerant circulating system) are respectively connected to the two opposite ends of the coil 32 by a respective connector 41. Further, switch or valve means may be provided at the connector 41 at one end of the coil 32 for controlling the operation of the refrigerator.

Figure 3:
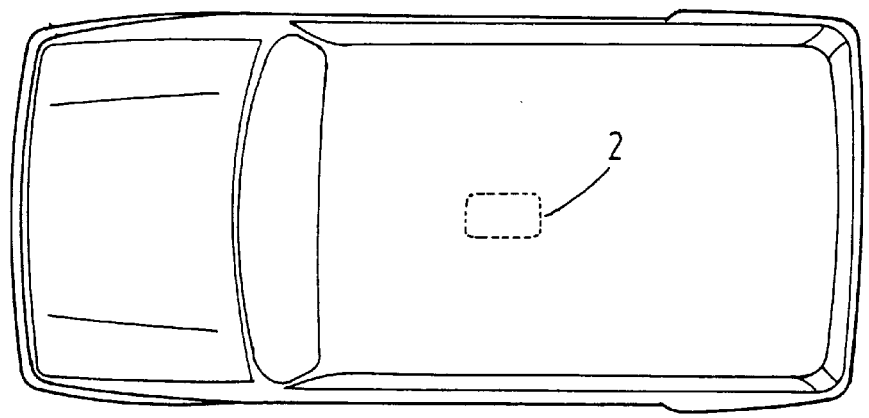
FIG. 3 shows an installation example of the present invention in a motor vehicle.

Referring to FIG. 3, the refrigerator 2 can be installed in the car at any desired location, and connected to the refrigerant circulating system thereof.

Figure 4:
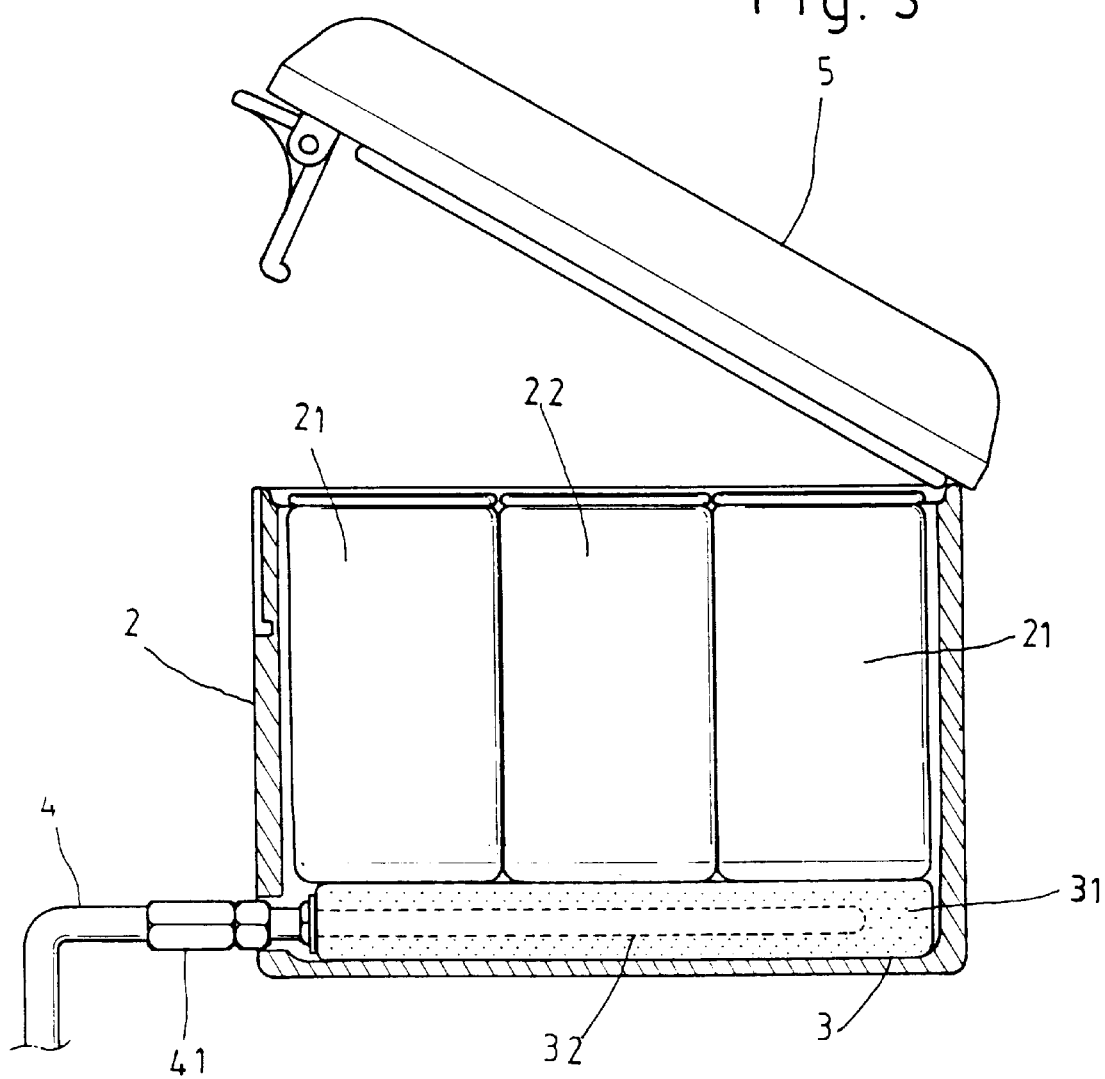
FIG. 4 shows caned beverage kept cool in the refrigerator according to the present invention.

Referring to FIG. 4 and FIG. 2 again, the refrigerator 2 has a hinged cover 5. When the hinged cover 5 is opened, caned beverage for example canned tea drink 21, caned coffee 22, etc., are kept cool in the refrigerator 2. The refrigerator 2 can be mounted in the console box adjacent to the driver's seat, and the shell of the console box can be served as the cover of the refrigerator instead of the console box 5.

As indicated above, the refrigerator 2 can keep food cool without consuming electric energy. Because the coil 32 is merged in the refrigerating liquid, the refrigerating medium freezes over during the circulation of the refrigerant in the refrigerant circulating system. When the car is stopped, the car engine does no work, the refrigerant is stopped from circulating through the coil 32, and the frozen refrigerating medium absorbs ambient heat and changes from ice to liquid.

While only one embodiment of the present invention has been shown and described, it will be understood that various modifications and changes could be made thereunto without departing from the spirit and scope of the invention disclosed.

What is claimed is:

1. A refrigerator mounted in a motor vehicle and connected to a refrigerant circulating system of the motor vehicle, comprising:

a liquid refrigerating medium container, said liquid refrigerating medium container contains a liquid refrigerating medium, a coil mounted inside said liquid refrigerating medium container is connected to a circulating loop of the refrigerant circulating system of the motor vehicle.

2. The refrigerator of claim 1 wherein:

said refrigerator is mounted in a console box inside the motor vehicle adjacent to a driver's seat.

3. The refrigerator of claim 1 wherein:

a switch means is provided at the connector at one end of said coil to control the operation of the refrigerator.

4. The refrigerator of claim 1 wherein:

said coil has two ends extending to an exterior of said liquid refrigerating medium container, each end of said coil includes a connector, said connectors are connected to the circulating loop of the refrigerant circulating system of the motor vehicle.

5. The refrigerator of claim 1 wherein:

said liquid refrigerating medium container is made from a material with a high cold transfer coefficient.

\* \* \* \* \*